Jan. 19, 1965 P. WAGREZ 3,166,173

ELECTROMAGNETICALLY CONTROLLED SORTER

Filed June 26, 1962 3 Sheets-Sheet 1

Inventor:
Pierre Wagrez by:
Michael S. Striker
Atty

ELECTROMAGNETICALLY CONTROLLED SORTER

Inventor:
Pierre Wagrez
by:
Michael S. Striker
Atty.

Inventor:
Pierre Wagrez
by:
Michael S. Striker
Atty 3,166,173
ELECTROMAGNETICALLY CONTROLLED SORTER Pierre Wagrez, 4 Ave. Courteline, Colombes, France
Filed June 26, 1962, Ser. No. 205,445
Claims priority, application France, June 28, 1961, 866,286
28 Claims. (Cl. 193—31)

This invention relates to distributing-selecting apparatuses for sorting small objects and sending them in different directions, in accordance with one or more of their characteristics serving as selection or sorting standards.

One problem of this kind, for example, is the sorting out, as a function of their resistivity, of germanium wafers intended for diodes or transistors. There, the problem is the very small size of the wafers, whose maximum diameter is of the order of 1 to 10 millimeters and whose thickness is of the order of 50 to 1000 microns.

Manual handling of such wafers is practically impossible, because it leads to prohibitively high expenses for checking and measuring; thus, it is necessary that sorting, as a function of a measurement, be done mechanically. The measurement of the thickness of tiny objects raises similar problems.

The apparatuses that perform these operations include feeding means and measuring means, the measurement generally being obtained in the form of an electrical signal.

Following this measurement, each object is directed, as a function of the resulting signal, towards a storage receptacle or a station or a channel corresponding to the signal.

It is known to effect this conveyance of the object by means of a series of tubes, each leading to a desired receptacle or station, and to use the measurement signal to position some means of conveyance, such as an arm or a movable tube, before the opening of the chosen tube.

Solutions of this kind have numerous disadvantages, particularly the possibility of grave errors caused either by the variable time and distance of conveyance or by the variable and uncontrollable nature of the time taken for a gravitational fall in a movable selector conduit.

Moreover, these apparatuses permit only a limited speed, because the times taken to convey an object along the selecting path is variable or poorly controlled.

In the apparatus of the invention, these disadvantages are eliminated, because the feeding and the selecting are simultaneously made from a single fixed point.

The apparatus of the invention comprises a set of tubes of the same length, mounted to freely pivot, at their base, in unstable equilibrium or balance about a vertical position. The tubes are mounted above receptacles or outlet channels and circularly arranged about a central stop means, such that the upper end of any tube resting upon the stop is located on the axis of the stop. The apparatus includes further a plurality of peripheral stops to limit the outward or centrifugal pivoting. Means are also provided for each tube for delivering, upon energization, an inward or centripetal blow to each tube, whereby the latter is rocked or pivoted towards the central stop, which houses in its interior a tapping means that kicks back, upon energization, any tube to its peripheral position.

The advantages of the sorter of the invention are particularly the following:

Objects can now be directed towards receptacles, stations, or various channels on the basis of being fed and selected at a single point. There are thus eliminated all of the disadvantages of those apparatuses in which the selection or sorting is effected through the variable path length of a conveying means and, particularly, the errors caused by premature falls while being conveyed and the limitation of speed caused by the variable conveying times.

The invention eliminates the disadvantages of mobile distribution conduits (particularly rotary ones), which cause errors by jamming of the objects in these conduits. When the unjammed objects fall once again, the distribution conduit has already changed its position, and the sorting for this reason is erroneous. Moreover, since the time taken for the objects to pass through the conduits cannot be closely controlled, the sorting speed is very limited.

The invention reduces the problem of transfer to one of individual, or piece by piece, conveyance from one stationary station to another stationary station: in the case in point, from the measuring station to a position above the axis of the selection means. These two points can be very close to each other, thereby permitting high, adjustable speed, without possibility of mistakes.

The invention reduces the problem of sorting control to one of control of the peripheral tapper of each tube, which tappers require only a brief electrical pulse.

The following arrangements, considered singly or in any combination, are also objects of the invention.

(1) The means for rocking, whether central or peripheral, consist of electromagnet plunger pistons that strike or tap the tubes.

(2) The peripheral electromagnets are arranged radially and the central electromagnet is arranged axially.

(3) To avoid bouncing when the tubes are stopped, permanent magnets are set in at least one of the stops.

(4) A support having the shape of a sector carries the central and peripheral stops, along with the striking means, the pivot axle of the tubes, and the storage bins or receptacles for the sorted objects.

(5) The tubes form a semi-circular row.

The invention will now be described in detail, with reference to the accompanying drawings, in which.

Figure 1:
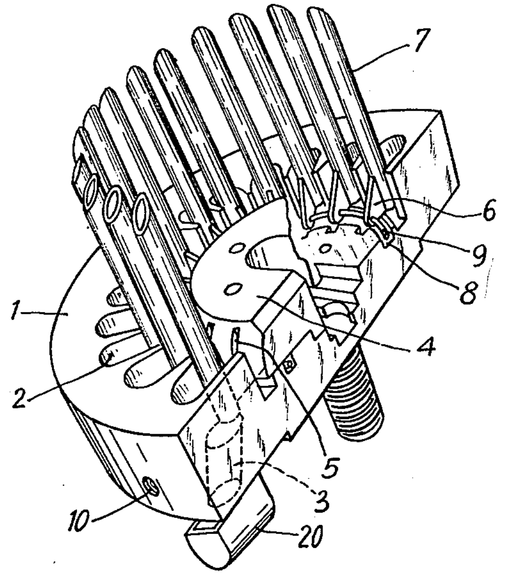
FIGURE 1 is a perspective view of the support base with the selection tubes, of one embodiment of the invention.

In the figures, 1 designates the actual base plate, which here has a semi-circular form and includes a plurality of oblong cavities 2, radially arranged at regular angles of arc, the bases of which are aligned with oblique conduits 3 formed in the body of the base plate.

The base plate includes a separate central portion 4 provided at its periphery with a plurality of radial slits 5, each slit being opposite a cavity 2. Feet of tubes 7 pivot in these slits. To this end, for example, a circular channel 8 is formed in base plate 1 and closed over by central portion 4 which forms a cover, and in which a sufficiently rigid wire 9, such as piano wire, is introduced and passed through holes in the feet of the tubes, whereby to function as a pivoting means for the feet. Mounting holes 10 permit the fastening of rim 11.

Figure 2:
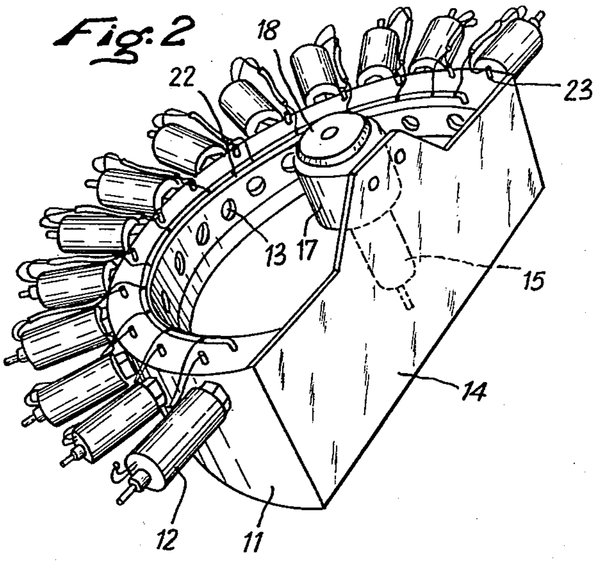
FIGURE 2 is a perspective view of the upper part of the support, with the central and peripheral striking means.

FIGURE 2 shows the peripheral rim 11 that surrounds base plate 1 and which carries a plurality of electromagnets 12 laterally and radially arranged, one for each cavity of the base plate. The rim is perforated by a plurality of radial passages 13 which allow the movement therethrough of rods 19 (FIGURE 3) of the cores of electromagnets 12, whereby to push upon the tubes.

The peripheral rim 11 also includes a central electromagnet 15, supported by plate 14. The movable armature 16 (FIGURE 3) of the electromagnet, moving in the central bore of a stationary stop sleeve 17, ends in a thrust disc 18.

Figures 3, 4, 5:
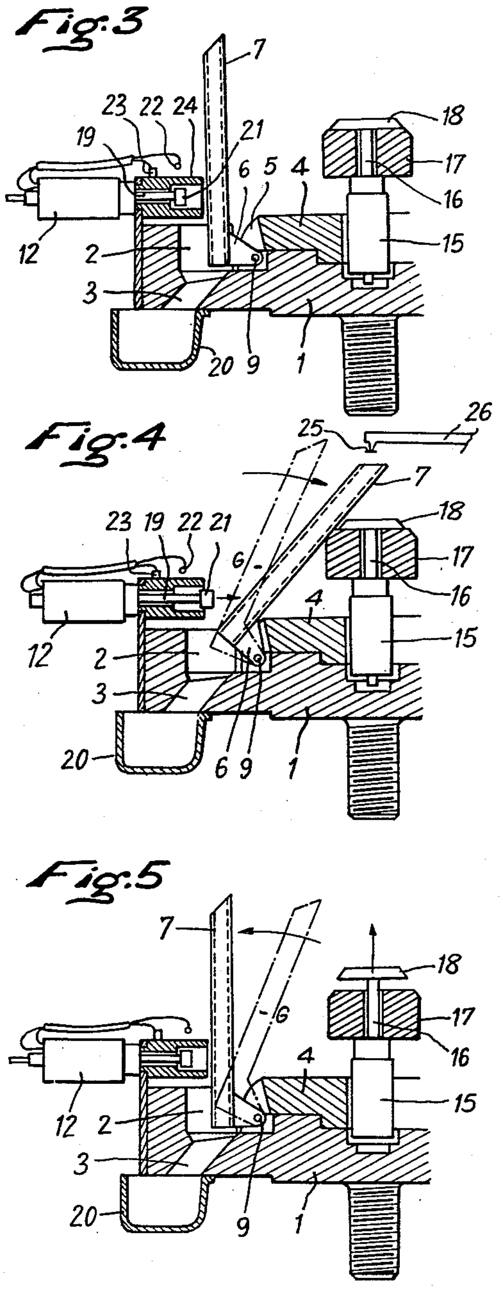
FIGURES 3, 4 and 5 are partial vertical sections illustrating the operation of the apparatus.

FIGURES 3, 4 and 5 are partial sectional views of the apparatus at three different stages of its operation.

FIGURE 3 shows the apparatus at rest, the tubes being in their vertical peripheral position. FIGURE 4 shows how a tube is rocked to its central inclined position. And FIGURE 5 shows how the inclined tube is returned to its original position.

In the position of FIGURE 3, neither the electromagnet 12 on the rim nor the central electromagnet 15 is energized. Tube 7 remains in a substantially vertical position resting against the end of hollow housing 24, in which movable rod 19 of electromagnet 12 slides. In this position of the tube, disk 18, fixed to movable armature 16 of the central electromagnet 15, rests by its weight on the central sleeve of stop 17.

In the position of FIGURE 4, electromagnet 12 is energized and rod 19, connected to the movable armature and elongated by a pusher 21, projects from housing 24 and strikes tube 7, which pivots on axle 9 and falls against central stop sleeve 17. In order that this position be stable, it is necessary, when the tube is in the intermediate position shown in broken line in FIGURES 4 and 5 between its vertical position and its position of rest against sleeve 17, that a vertical dropped from its center of gravity G passes through its pivot point 9.

In the position of FIGURE 5, the central electromagnet 15 is energized; movable armature 16 and its terminating plate 18 rise; tube 7 is struck by the latter and is tipped in the opposite direction. In returning to its original vertical position, the tube pushes rod 21 back, whereby a part of the kinetic energy of the tube is absorbed and its bouncing avoided.

In FIGURE 4 there is shown a feeding means 26, of any known type, holding an object 25, after it has been checked and measured, above the upper end of a tube 7, which abuts against central stop 17.

The apparatus operates in the following manner.

At the start of operation all tubes 7 are assumed to be in the position of FIGURE 3. When object 25 is made the object of any measurement whatever, by some appropriate means not shown, the measurement produces a precise electrical signal which actuates one of the electromagnets 12 and pushes one of the tubes 7 to the position of FIGURE. 4. The measurement finished, a conveying means 26 of any kind whatever carries object 25 from the measuring station to the position of FIGURE 4, that is, on the axis of stop 17 and above tube 7, which is located in the receiving position.

Object 25 is released by means 26 and falls into tube 7, where it is led by gravity to the corresponding receptacle 20. As soon as means 26 has released object 25, the chamfered disc 18 rises to push tube 7 back to the vertical position, and the apparatus is ready to respond to a new sorting signal.

It will be noted that:

(1) The tubes are free of any mechanical control. Since they pivot unstably about their pivot points 9 at their bases, they can assume only two extreme positions: that of FIGURE 3 or that of FIGURE 4. To the advantage of the mechanical simplicity resulting from this arrangement there is added the advantage of being able to obtain increased speed, which is limited solely by the time it takes to rock a tube back and forth between the two extreme positions, which time can be reduced by a choice of appropriate dimensions for the parts.

(2) The tubes are not held in their stable extreme positions by the electromagnets, but solely by gravity. The electromagnets are used only for the time taken to deliver the strikes or taps. The duration of their energization is therefore very short and separated by relatively long rest periods. Consequently, the electromagnets neither heat up nor wear out.

(3) That the time taken for an object to fall down a tube does not influence the sorting. Consequently, if unequal friction results in unequal fall times in tubes 7, no possible sorting error can result therefrom.

Figure 6:
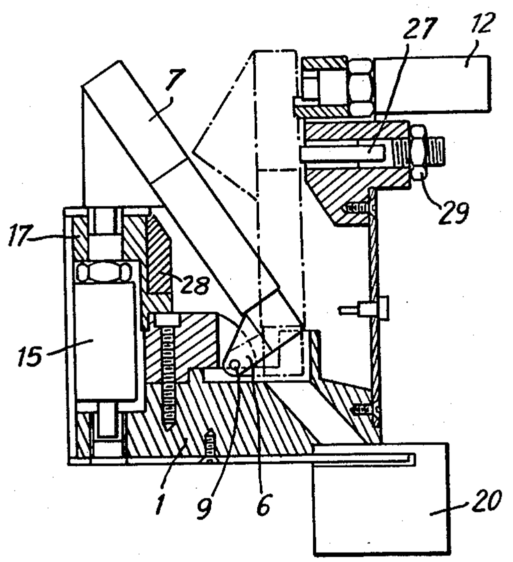
FIGURE 6 is a partial vertical section of a second embodiment of the apparatus.

FIGURE 6, in a view analogous to FIGURES 3, 4, and 5, shows another embodiment of the invention, in which:

(A) The upper part of each tube includes a lateral foot which comes to rest on the central stop, thereby assuring an improved positioning of the tube and a better delivery of the return strike or tap.

(B) To avoid bouncing, the seats are provided with permanent magnets 27 and 28, which hold the tubes in place. These magnets preferably are positioned with an adjustable gap, as, for example, by means of a screw 29. This latter arrangement permits the speed of operation to be raised, by lightening the tube and adjusting the pull and hold of the permanent magnets.

(C) The peripheral electromagnets 12 are located so as to push upon the upper part of a tube, thereby increasing to the maximum the lever arm through which the disengaging shock acts and assuring the maximum effectiveness of the electromagnets 12.

The above description of the invention is given by way of example only, and not in limitation thereof.

In particular, the shape and sizes of the various parts constituting the apparatus can be any whatever: the base plate can take the shape of whole circle, of a semi-circle, of any arc whatever of a circle, or of a shape other than circular. The number of tubes and parts associated therewith can be any whatever. The cross-section of the tubes need not be circular; their length and the shape of their ends can be any whatever, as can the material of which they are made, which may be metal or plastic. The tubes can combine metal and plastic, having a metal base on which is slipped a plastic tube or vice-versa. The tubes need not have a constant cross section but can be conical or flared at one end to facilitate the introduction of objects. The tubes can open into different planes.

The arrangement shown in the figures, comprising an inner base plate and a separable surrounding rim, is, however, advantageous, because it allows the apparatus easily to be broken down for inspection and maintenance.

While the invention has been described with respect to the sorting of tiny pieces, such as germanium wafers, it is self evident that it is applicable to any other sorting of small objects, as the sorting of ball bearings according to their diameter, and, in general, to any kind of small object as a function of any physical characteristic whatever.

What I claim is:

1. Material handling apparatus for sorting objects in response to sorting signals, including first means for successively conveying each of said objects to a common point in space and for releasing them at said common point; a plurality of movable guide means having each an inlet end and an outlet end and having a first extreme stable position and a second extreme stable position, said inlet end of each guide means cooperating with said common point in said second position for receiving a released object, each said inlet end occupying substantially the same point in space in said second position; a plurality of second means, one for each of said movable guide means, for causing, in response to said sorting signals, said guide means selectively to move from said first position to said second position; third means for causing said guide means to move from said second position to said first position; individual fourth means communicating with a corresponding one of said outlet ends for receiving said objects, whereby said objects, on being released, are guided to the appropriate one of said fourth means.

2. Material handling apparatus for sorting objects in response to sorting signals comprising, in combination, first means for successively conveying each of said objects to a common point in space and for releasing them at said common point; a plurality of movable guide means having each an inlet end and an outlet end and being movable between a first and a second extreme stable position, said inlet end of each guide means cooperating in said second position with said common point for receiving a released object, each of said inlet ends occupying when the respective guide means is in said second position substantially the same point in space; a plurality of second means, one for each of said movable guide means, for causing in response to said sorting signals said guide means selectively to move from said first to said second position, said second means including striking means and means for actuating said striking means; third means including a single striking means and means for actuating said single striking means for causing said guide means to move from said second position to said first position; and a plurality of fourth means, one for each guide means and respectively communicating with the outlet ends of said guide means for receiving said objects, whereby said objects, on being released, are guided to the appropriate one of said fourth means.

3. The apparatus of claim 2, in which said means for actuating said second and third means are electrically controlled.

4. The apparatus of claim 2, in which said means for actuating said second and third means includes an electromagnet energized by said sorting signals.

5. The apparatus of claim 2, wherein at least part of the kinetic energy of a guide means, on returning from said second position to said first position, is absorbed by the corresponding striking means of said second means.

6. The apparatus of claim 1, including pivot means for said guide means, whereby said guide means pivot between said two extreme stable positions.

7. The apparatus of claim 6, fifth means fixed to the base of each of said guide means, and means in said fifth means for receiving said pivot means.

8. The apparatus of claim 2, wherein said guide means form a first row and said second means form a second row substantially parallel to said first row.

9. The apparatus of claim 8, wherein said guide means are carried by a first separate base means and said second and third means by a second separate base means, said two base means fitting together, whereby said sorter is comprised of at least two separable parts.

10. The apparatus of claim 1, including means cooperating with at least one of said second and third means to accelerate the movement of each of said moved guide means and to hold said guide means until the corresponding one of said second or third means is actuated.

11. The apparatus of claim 10, wherein said means for cooperating is comprised of at least one magnet.

12. The apparatus of claim 11, wherein there are individual magnets for each of said guide means in said first position and at least one magnet for said guide means in said second position.

13. The apparatus of claim 6, wherein a vertical dropped from the center of gravity of a guide means passes through said pivot means when said guide means is substantially midway between said two stable positions.

14. The apparatus of claim 2, wherein each of said guide means includes a member radially extending therefrom in the vicinity of said inlet end and taking support on said third means in said second position to receive the strike thereof.

15. The apparatus of claim 10, including pivot means for each of said guide means, whereby said guide means pivot between said two extreme positions.

16. The apparatus of claim 11, including pivot means for each of said guide means, whereby said guide means pivot between said two extreme positions.

17. The apparatus of claim 12 including pivot means for each of said guide means, whereby said guide means pivot between said two extreme positions.

18. The apparatus of claim 15, wherein each of said guide means includes a member radially extending therefrom in the vicinity of said inlet end and taking support on said third means in said second position, whereby said third means acts on said radial member, to move the corresponding guide means.

19. The apparatus of claim 16, wherein each of said guide means includes a member radially extending therefrom in the vicinity of said inlet end and taking support on said third means in said second position, whereby said third means acts on said radial means to move the corresponding guide means.

20. The apparatus of claim 17, wherein each of said guide means includes a member radially extending therefrom in the vicinity of said inlet end and taking support on said third means in said second position, whereby said third means acts on said radial means to move the corresponding guide means.

21. The apparatus of claim 2, including means cooperating with at least one of said second and third means to accelerate the movement of each of said moved guide means and to hold said guide means until the corresponding one of said second or third means is actuated; and pivot means for each of said guide means, whereby said guide means pivot between said two extreme positions.

22. The apparatus of claim 21, wherein said means for cooperating is comprised of at least one magnet.

23. The apparatus of claim 22, wherein there are individual magnets for each of said guide means in said first position and at least one magnet for said guide means in said second position.

24. The apparatus of claim 22, wherein each of said guide means includes a member radially extending therefrom in the vicinity of said inlet end and taking support on said third means in said second position to receive the strike thereof.

25. The apparatus of claim 21, in which said means for actuating said second and third means are electrically controlled.

26. The apparatus of claim 21, in which said means for actuating said second and third means includes an electromagnet energized by said sorting signals.

27. Material handling apparatus for sorting objects in response to sorting signals comprising, in combination, first means for successively conveying each of said objects to a common point in space and for releasing them at said common point; a plurality of movable guide means having each an inlet end and an outlet end and being movable between a first and a second extreme stable position, said inlet end of each guide means cooperating in said second position with said common point for receiving a released object, each of said inlet ends occupying when the respective guide means is in said second position substantially the same point in space; support means supporting said plurality of guide means at fixed locations about said common point, each movable only between said positions thereof; a plurality of second means, one for each of said movable guide means, for causing in response to said sorting signals said guide means selectively to move from said first to said second position, third means for causing said guide means to move from said second position to said first position; and a plurality of fourth means, one for each guide means and respectively communicating with the outlet ends of said guide means for receiving said objects, whereby said objects, on being released, are guided to the appropriate one of said fourth means.

28. A method of sorting objects comprising the steps of transferring an object to a point in space; providing a plurality of guide means at fixed locations about said point in space and a receiving means at the outlet end of each guide means; tipping a selected one of said plurality of guide means to align its end opposite to the outlet end with said point in space; dropping said object into said opposite end of the selected tipped guide means to thereby guide the object into the receiving means at the outlet end of the selected guide means; returning the guide means to its original position after the object is dropped; transferring another object to said point; and tipping a selected one of said guide means and thereby to repeat the sorting operation.

References Cited by the Examiner

UNITED STATES PATENTS

| | | | |
|---|---|---|---|
| 86,410 | 2/69 | Johnson | 193—31 X |
| 648,102 | 2/00 | Bates | 193—31 |
| 2,341,475 | 2/44 | Parra | 193—31 X |
| 3,027,699 | 4/62 | Miller | 53—251 X |

ROBERT B. REEVES, *Acting Primary Examiner.*